United States Patent
Loewenstein (10) Patent No.: US 7,657,710 B2
(45) Date of Patent: Feb. 2, 2010

(54) CACHE COHERENCE PROTOCOL WITH WRITE-ONLY PERMISSION

(75) Inventor: Paul N. Loewenstein, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 466 days.

(21) Appl. No.: 11/561,203

(22) Filed: Nov. 17, 2006

(65) Prior Publication Data

US 2008/0120441 A1 May 22, 2008

(51) Int. Cl.
*G06F 12/00* (2006.01)

(52) U.S. Cl. .................. 711/141; 711/117; 711/144; 710/22

(58) Field of Classification Search ......... 711/117–118, 711/141, 144, 156; 710/22
See application file for complete search history.

(56) References Cited

U.S. PATENT DOCUMENTS

| | | | |
|---|---|---|---|
| 6,633,958 B1 | 10/2003 | Passint | |
| 6,748,498 B2 | 6/2004 | Gharachorloo et al. | |
| 6,868,481 B1 | 3/2005 | Gaither et al. | |
| 6,874,053 B2 | 3/2005 | Yasuda et al. | |
| 6,883,070 B2 | 4/2005 | Martin et al. | |
| 2005/0273545 A1 | 12/2005 | Denneau et al. | |
| 2006/0026355 A1 | 2/2006 | Okawa et al. | |
| 2006/0036809 A1 | 2/2006 | Rudd | |
| 2006/0059317 A1 | 3/2006 | Kakeda | |
| 2006/0095684 A1 | 5/2006 | Shen | |
| 2006/0101209 A1 | 5/2006 | Lais et al. | |
| 2006/0106995 A1 | 5/2006 | Shen | |
| 2006/0230237 A1 | 10/2006 | Sakamoto | |
| 2006/0248285 A1 | 11/2006 | Petev | |
| 2006/0248286 A1 | 11/2006 | Scott et al. | |
| 2008/0005485 A1* | 1/2008 | Gilbert et al. | 711/146 |

* cited by examiner

*Primary Examiner*—Jasmine Song
(74) *Attorney, Agent, or Firm*—Robert C Kowert; Meyertons, Hood, Kivlin, Kowert & Goetzel, P.C.

(57) ABSTRACT

A system may include a processor node, and may also include an input/output (I/O) node including a processor and an I/O device. The processor and I/O nodes may each include a respective cache memory configured to cache a system memory and a respective cache coherence controller. The system may further include interconnect through which the nodes may communicate. In response to detecting a request for the I/O device to perform a DMA write operation to a coherence unit of the I/O node's respective cache memory, and in response to determining that the coherence unit is not modified with respect to the system memory and no other cache memory within the system has read or write permission corresponding to a copy of the coherence unit, the I/O node's respective cache coherence controller may grant write permission but not read permission for the coherence unit to the I/O node's respective cache memory.

20 Claims, 6 Drawing Sheets

CACHE COHERENCE PROTOCOL WITH WRITE-ONLY PERMISSION

BACKGROUND OF THE INVENTION

1. Field of the Invention

This invention relates to computer systems, and, more particularly, to memory coherence protocols in multiprocessor systems.

2. Description of the Related Art

In order to increase the performance of computer systems, system designers often look towards techniques that increase the amount of concurrent or parallel processing that occurs within the system. For example, within a microprocessor, the ability of the microprocessor to execute multiple instructions in parallel may be increased in a fine-grained fashion by adding independent functional units and related execution resources using superscalar implementation techniques, or in a coarse-grained fashion by replicating individual processor cores within the microprocessor. Parallelism may be augmented at other levels of abstraction within the computer system, for example by providing multiple microprocessors within the system (also referred to as multiprocessor systems), or by integrating multiple discrete systems or subsystems together via a network or other type of interconnect to create a still more complex parallel system.

In parallel systems that provide access to shared memory, the possibility exists that two or more independent, concurrently executing processor tasks may attempt to concurrently access the same addressable location in memory. For example, one task may attempt to write the location at the same time the other attempts to read it. Absent some technique to predictably order or regulate such concurrent memory accesses, unpredictable or erroneous execution behavior may result. For example, the two tasks mentioned may produce different computational results depending on the order in which the write occurs relative to the read, which otherwise might be completely random. Similar problems may occur if different processors in a multiprocessor system attempt to locally cache shared data.

Generally, the problems that may arise from multiple tasks, processors or other types of agents attempting to concurrently access and/or modify shared data may be referred to as memory coherence problems, in that in the absence of ordering or control, shared data may become incoherent with respect to the agents sharing it. Frequently, designers of systems in which coherence problems may arise employ some type of coherence mechanism through which access to memory is governed by well-defined, coordinated procedures. For example, a coherence protocol such as the MESI protocol may be employed to prevent coherence problems by prescribing a closed set of possible coherence states (e.g., Modified, Exclusive, Shared or Invalid) that may correspond to any addressable quantum of memory or "unit of coherence" at a given time, and by further prescribing specific actions to be undertaken by or on behalf of a processor, task or other agent in response to various types of memory activity such as read or write activity.

Memory coherence protocols typically rely on the activity of one agent being visible with respect to other agents so that they may respond appropriately. Such visibility is often provided through the use of shared buses across which memory transactions may be broadcast to the various processors or other enforcers of the coherence protocol. For example, a write request to a particular memory address may be broadcast across a bus to multiple processors within a system such that all processors understand that their own copies of data at the particular address may no longer be valid.

The performance of shared buses tends to scale poorly as the number of attached devices increases. To improve operating frequency, point-to-point connections may be used in place of shared buses. However, this may increase the complexity and operating overhead required to maintain memory coherence, since memory transactions occurring over a particular point-to-point connection may no longer be globally visible to the rest of a system. Memory coherence may still be enforced, for example, by requiring data to be loaded from a system memory into a local cache before it is read or modified, thus making the various caches in the system the loci of coherence activity, rather than a shared bus. However, requiring that data be loaded into a processor's cache to ensure coherence may be particularly wasteful when that data is destined to be overwritten, for example as part of a Direct Memory Access (DMA) transfer from an input/output (I/O) device.

SUMMARY

Various embodiments of a cache coherence protocol including write-only permission for coherence units disclosed. According to one embodiment, a system may include a number of nodes including a processor node and an input/output (I/O) node. The processor node and I/O node may respectively include a processor and an I/O device, and each of the processor and I/O nodes may include a respective cache memory and a respective cache coherence controller. The respective cache memories may be configured to cache a system memory. The system may further include an interconnect through which each of the nodes is configured to communicate with other nodes.

In response to detecting a request for the I/O device to perform a direct memory access (DMA) write operation to a particular coherence unit of the I/O node's respective cache memory, and in response to determining that the particular coherence unit is not modified with respect to the system memory and that no other cache memory within the system has read or write permission corresponding to a copy of the particular coherence unit, the I/O node's respective cache coherence controller may be configured to grant write permission but not read permission for the particular coherence unit to the I/O node's respective cache memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

In the following discussion, an embodiment of a general computer system is first discussed. Subsequently, an embodiment of a general coherence protocol that provides for write-only permission to a coherence unit is described. A particular coherence protocol that conforms with the general protocol is then discussed in detail.

Overview of Exemplary Computer System

Figure 1:
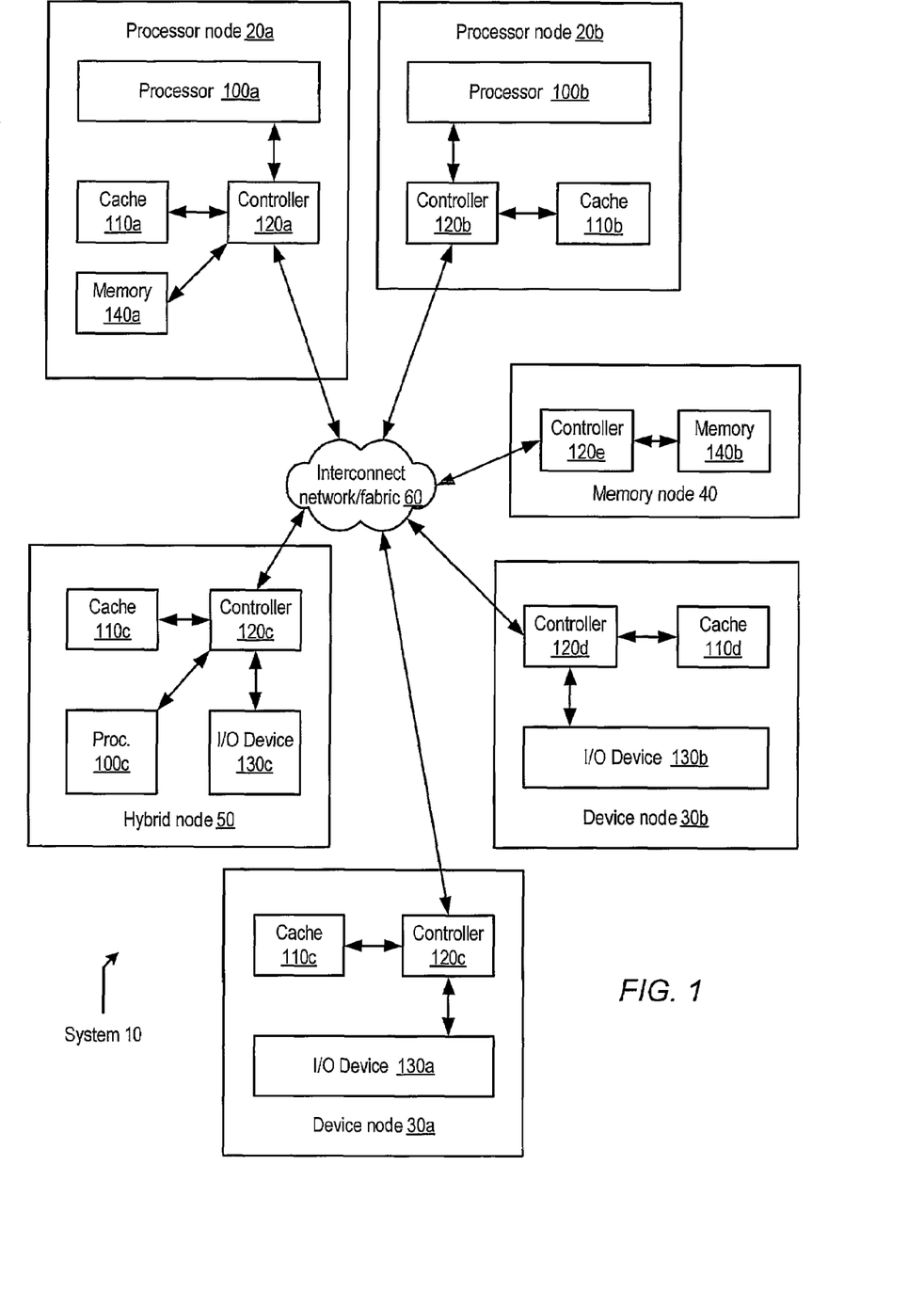
FIG. 1 is a block diagram illustrating one embodiment of a computer system.

FIG. 1 illustrates one embodiment of a computer system in which the various memory coherence techniques described herein may be implemented. In the illustrated embodiment, computer system 10 includes a number of different types of nodes coupled to communicate with one another via an interconnect network or fabric 60 (or simply, interconnect 60). Specifically, system 10 includes two processor nodes 20a-b, two device nodes 30a-b, a memory node 40, and a hybrid node 50. As described in greater detail below, each node includes a respective cache 110a-f and a respective controller 120a-f, as well as various other components. It is noted that the illustrated configuration is merely exemplary, and it is contemplated that other embodiments of system 10 may include more or fewer numbers and/or different types of nodes.

Different types of nodes within system 10 may be configured to perform different functions. In the illustrated embodiment, processor nodes 20a-b may include respective processors 100a-b configured to interface with respective controllers 20a-b. Each of processors 100 may be any suitable processor capable of executing instructions. For example, in various embodiments each of processors 100 may be a general-purpose or embedded processor implementing any of a variety of instruction set architectures (ISAs), such as the x86, PowerPC, SPARC, or MIPS ISAs, or any other suitable ISA. In multiprocessor systems, each of processors 100 may commonly, but not necessarily, implement the same ISA. In some embodiments, a processor node 20 may include more than one processor 100, and/or may include a processor 100 having multiple processor cores capable of independent execution of programs, processes or threads.

As shown in FIG. 1, device nodes 30a-b may be organized in a fashion similar to processor nodes 20a-b, but may include respective input/output (I/O) devices 130a-b rather than processors 100a-b. In various embodiments, I/O devices 130 may include any type of peripheral device suitable for inclusion within a computer system. For example, an instance of I/O device 130 may include a mass storage device, such as a disk or tape drive or any other type of magnetic, optical or solid-state storage device. In another embodiment, an embodiment of I/O device 130 may include a network device such as a wired or wireless Ethernet or other type of local area network (LAN) interface, a wide area network (WAN) interface, or any other type of communication device suitable for interfacing system 10 to other systems or networks. In still other embodiments, I/O device 130 may correspond to other types of peripheral devices such as scanners, graphical display devices (e.g., graphics coprocessors or subsystems), etc., or to peripheral interfaces suitable for interconnecting such devices to a system such as a version of a Peripheral Component Interconnect (PCI) interface, an Advanced Graphics Port (AGP) interface, or another type of peripheral interface device. It is noted that in some embodiments, a device node 30 may include more than one I/O device 130. Also, in the illustrated embodiment, hybrid node 50 may be configured to include both a processor 100c and an I/O device 130c within the same node, with both devices configured to communicate with controller 120f.

Processor nodes 20, I/O nodes 130 and hybrid nodes 50 may be configured to store local copies of data and/or executable code within respective caches 110. Generally speaking, caches 110 may be configured according to any suitable cache architecture and implemented using any suitable memory technology. For example, caches 110 may be configured as direct mapped, set associative or fully associative caches of any suitable size, and may be implemented using any of various static or dynamic random access memory (RAM) technologies. In some embodiments, caches 110 and/or controllers 120 may be integrated within other components of their respective nodes, such as within processors 100, for example. Also, in some embodiments, various nodes may implement multiple different caches arranged in a hierarchy. For example, a cache 110 may be a first-level cache, a second-level cache, or a higher-level cache in a multiple-level cache hierarchy.

Caches 110 may generally be configured to cache some portion of an addressable memory space corresponding to a system memory. That is, at any given time, the addressable locations cached by caches 110 may be a subset of the addressable locations provided by a larger and typically slower system memory. System memory may be provided within system 10 in any of several different ways. It may be included within processor nodes 20, I/O nodes 130 or hybrid nodes 50, for example as system memory 140a included within processor node 20a of FIG. 1. System memory may also be provided within a node that need not include processor or I/O devices. For example, memory node 40 of FIG. 1 includes system memory 140b coupled to controller 120e. (It is noted that in the illustrated embodiment, a cache 110 need not be included in a memory node that lacks a device capable of directly modifying memory contents, such as a processor 100 or I/O device 130.) Generally speaking, instances of system memory 140 may be implemented using any suitable memory technology, such as a variant of Synchronous Dynamic RAM (SDRAM), Fully Buffered Dual Inline Memory Modules (FB-DIMMs), static RAM (SRAM), nonvolatile/Flash-type memory, or another type of memory. In some embodiments, all system memory for system 10 may be provided by a single node, while in other embodiments system memory may be distributed within several different nodes.

Interconnect 60 may be implemented using any technology suitable for inter-processor or inter-node communication. In one embodiment, interconnect 60 may be implemented as a shared logical or physical bus that the various nodes may negotiate to use. For example, interconnect 60 may include separate resources (e.g., signal traces) for parallel data and control transmission, or may multiplex data and control transactions over a single resource. A PCI-type interface may be one example a shared bus that may be used to implement interconnect 60, though other types of shared-bus interconnects are possible and contemplated. In another embodiment, interconnect 60 may be implemented as a switched or routed fabric capable of conducting multiple concurrent communication sessions among different nodes. For example, interconnect 60 may be configured to be compliant with a version of the RapidIO switched-fabric standard, the InfiniBand™ interconnect, or another suitable type of fabric interface. In still another embodiment, node-to-node communication provided by interconnect 60 within system 10 may be implemented by point-to-point connections among the nodes themselves, rather than each node connecting to a switch or other fabric device. For example, each node may have point-to-point connections to various neighbors according to a ring, cube, hypercube or other suitable topology. It is noted that in the latter two embodiments, physical interconnects between nodes and switches or other nodes may be implemented as high-speed serial point-to-point interconnects. Generally speaking, a point-to-point interconnect provides a physical communication path coupling a single sender and a single receiver, in contrast to a shared interconnect in which more than two nodes may be coupled. A point-to-point interconnect may be bidirectional or unidirectional.

In one embodiment, each instance of controller 120 may be configured to coordinate memory activity for its corresponding node. For example, a particular controller 120 may receive requests to read or write various addressable memory locations from another device located within a particular node, such as a processor 100. In the course of processing such a request, controller 120 may determine whether the requested locations (which may variously include data or executable code) are cached within the cache 110 of the particular node. If not, the particular controller 120 may be configured to obtain the contents of the requested memory location from another source. For example, the particular controller 120 may obtain the most current version of the requested memory location from a cache 110 of another node, or from a system memory included within the particular node or another node. Upon receiving the contents of the requested location, the particular controller 120 may install this information within the cache 110 of the particular node and/or may forward the information to the requesting device.

It is noted that in some embodiments, the functionality of controller 120 may be partitioned into multiple different functional units that may be integrated within various other components of a node. For example, controller 120 may be implemented as a cache controller configured to manage access to cache 110, and as a distinct memory controller configured to control access to intra-node system memory 140 and/or caches or memories within other nodes. Additionally, in some embodiments, not every memory access generated within a node need result in a request processed by controller 120. For example, in embodiments where an instance of processor 100 includes a higher-level cache than cache 110, accesses that hit within the higher-level cache may be processed within processor 100 without need for reference to cache 110 or controller 120. In some such embodiments, if a higher-level cache entry in a first node becomes invalid due to memory activity (e.g., a store) in a second node, controller 120 of the first node may be configured to invalidate the entry wherever it exists within the first node (e.g., within cache 110 and any higher-level caches) according to the implemented cache coherence protocol, as discussed in greater detail below.

I/O Direct Memory Access Transfers and Coherence

During the course of operation of system 10, significant quantities of data may be transferred from one or more I/O devices 130 into one or more of system memories 140 or caches 110. For example, an I/O device 130 may include a mass storage device configured as part of a virtual memory system, or a network device configured to receive high-bandwidth streaming data from another system. As virtual memory pages are retrieved or network packets are received, they may be transferred into system memory in order to be operated on by other nodes within system 10. In order to improve the efficiency of transferring large quantities of data to or from I/O devices 130, system 10 may support a direct memory access (DMA) transfer feature.

Generally speaking, a DMA transfer refers to a mode of data transfer between an I/O device and system memory that is conducted primarily by the I/O device involved in the transfer with little or no involvement on the part of an external agent such as a processor 100. Typically, a processor 100 may initiate or request a DMA transfer into memory (a "DMA write" to memory) from a particular I/O device 130 by conveying to the particular device an indication of the quantity and location of data to be transferred and a destination address for the transfer. For example, processor 100a may request I/O device 130a to retrieve M bytes of data beginning at device address N (or, alternatively, to retrieve the data beginning at device address N and ending at device address P) and to store the retrieved data within the system memory address space beginning at memory address A. Once the DMA transfer has been appropriately initialized, the actual transfer of data into memory may be performed by I/O device 130a without involvement of processor 100a, thus leaving processor 100a free to perform other tasks while the transfer progresses. DMA read operations in which data is transferred from memory to an I/O device 130 may be performed in a manner similar to the DMA write operations just described. In some embodiments, it is contemplated that an I/O device 130 may be configured to autonomously initiate a DMA transfer without being directly requested to do so by a processor 100 or other device. For example, an I/O device 130 may maintain a queue of outstanding I/O requests from various other nodes or devices, and may be configured to set up DMA transfers for each outstanding request in turn, using default or previously negotiated transfer parameters.

DMA write activity may have memory coherence implications in systems like system 10. For example, I/O device 130a may perform a DMA write to a region of system memory 140b that also happens to be cached within cache 110b of processor node 20b. As a result of the DMA activity, the cached copy of the modified memory region may become stale, and incorrect computation, deadlock or other undesirable effects might result if processor node 20b continues to rely on the stale data.

In some embodiments, a coherence protocol implemented by the various nodes of system 10 may be configured to avoid coherence problems by ensuring that memory write activity (whether originating from I/O devices, processors or other sources) is consistently ordered with respect to each node of system 10. For example, a coherence protocol may dictate that in the above example, the DMA write to system memory 140b should cause the cached copy within cache 110b to be invalidated, forcing processor node 20b to refresh the cached copy to reflect the effects of the DMA write. In an embodiment of system 10 where all memory transactions are visible to all nodes in the system via interconnect 60, such a protocol may be relatively simple to implement, since each node need only observe or "snoop" transactions occurring on the shared interconnect. When a given node observes a transaction that affects the coherence state of its own local copy of memory, it may take an appropriate action to preserve memory coherence as defined by the implemented coherence protocol.

However, as noted above, point-to-point interconnect techniques are increasingly supplanting shared bus techniques in order to increase system performance and scalability. As a consequence, memory transactions occurring across interconnect 60 may not be globally visible. For example, the aforementioned DMA write transaction from I/O device 130*a* to system memory 140*b* may not be directly visible to processor node 20*b* via interconnect 60.

In some embodiments, the loss of concurrent global visibility of memory transactions may be overcome by enforcing coherence at the level of caches 110 rather than interconnect 60. For example, a processor node 20 that seeks to perform a write to a memory location may first ensure that a copy of the location is resident within its cache 110 and that it has permission to write the data according to the coherence protocol. Frequently, coherence activity may be performed with respect to a unit of memory coherence that may be larger than the size of the requested memory access, such as a cache line or block. For example, in response to detecting a write request from a processor 100, one embodiment of controller 120 may be configured to determine whether the cache line corresponding to the requested location is resident within cache 110 with write permission.

If the cache line or other coherence unit is not present or lacks write permission, controller 120 may be configured to coordinate with other controllers 120 within system 10 to obtain the coherence unit and/or permission to write to the unit. For example, controller 120 may broadcast a request (which may also be referred to as a memory probe) to each other controller 120 within system 10 indicating its intent to modify the requested coherence unit. It is noted that in embodiments where point-to-point or switched-fabric interconnections are used to interconnect various nodes within system 10, a broadcast of a request to multiple nodes may be implemented as a number of unicast (1-to-1) or multicast (1-to-many) requests. Alternatively, some embodiments of system 10 may employ a coherence directory indicating the location and possibly the coherence state of various coherence units within system 10 at any given time. In such embodiments, the requesting controller 120 may consult the coherence directory and convey its requests to just those nodes indicated by the directory as storing a copy of the requested coherence unit. In other embodiments, system 10 may be configured to employ a combination of broadcast and directory-based techniques or other suitable techniques for conveying coherence protocol information among controllers 120.

The behavior of a node upon receiving a request from another node indicating an intention to modify a particular coherence unit will depend on the details of the particular coherence protocol employed. In one embodiment, if the receiving node has a copy of the coherence unit in an unmodified or "clean" state with respect to system memory, the receiving node may simply invalidate its local copy of the unit. If its local copy is modified or "dirty" with respect to system memory, the receiving node may return its modified copy of the unit to the requesting node and/or write back its copy to system memory in addition to invalidating it.

Numerous variations and optimizations of system behavior in response to memory coherence activity are possible and contemplated, depending on the features of the coherence protocol employed as well as the implementation characteristics of system 10, such as the number of nodes deployed, the latency of system memory, the nature of the expected processing workload, or other factors. Regardless of these particular variations, however, it may generally be the case that once all relevant nodes have processed a request indicating the requesting node's intention to modify a particular coherence unit, the requesting node will have obtained a current copy of the particular unit as well as permission to modify that unit. That is, other nodes will have either invalidated their local copies of the particular coherence unit, or will otherwise provide a facility for subordinating their future use of that unit to the requesting node's write activity. For example, in some embodiment other nodes may continue to use the particular coherence unit in a speculative fashion and may subsequently cancel or unwind work performed dependent on the particular coherence unit if such work is found to conflict with the requesting node's modifications to the particular unit.

It is noted that in order to obtain permission to perform a processor-initiated memory write, such as an ordinary store instruction that may be executed by one of processors 100, a controller 120 may need to obtain a current copy of the entire coherence unit affected by the write (or possibly multiple coherence units, if the write is not aligned within a single unit). In many embodiments, this may arise because processor-initiated memory writes may typically affect data quantities that are smaller than a coherence unit. For example, a typical cache-line-sized coherence unit may encompass 64, 128 or more bytes, whereas the ISA implemented by a processor 100 might provide for a maximum store operand size of, e.g., 16 bytes. Thus, in order to properly reflect the state of the coherence unit following the processor's write, it may be necessary to merge the modified data with the remainder of the coherence unit as obtained from another node of system memory (or, alternatively, as may already be present within cache 110 of the writing node).

While processor-initiated writes may typically be smaller than coherence units, DMA writes may often be performed over entire coherence units or multiple such units. For example, DMA writes may frequently be kilobytes or megabytes in size. When an entire coherence unit is destined to be overwritten as a result of a DMA write, there may be little purpose in obtaining a current copy of that coherence unit in the course of obtaining write permission as with processor-initiated writes. That is, obtaining a copy of coherence unit data that will be written before it is read may be wasteful of memory bandwidth as well as interconnect bandwidth (e.g., via interconnect 60). For large DMA write operations, unnecessary read operations related to coherence protocol activity may degrade overall system performance by displacing other, more useful memory activity.

In one embodiment, the coherence protocol implemented by system 10 may be configured to distinguish a write operation that is intended to completely overwrite a coherence unit from a write operation that is intended to partially overwrite a coherence unit. For example, granting a node permission to write a particular coherence unit typically includes an implicit grant of read permission to that coherence unit. The prospect of the node reading some portion of the particular coherence unit that is created by the implicit grant of read permission requires that a current version of the particular coherence unit be obtained and installed within the node, if less than the entire coherence unit is to be written. By contrast, if a node intends only to write an entire coherence unit and not read any portion of it, such as in the DMA write case described above, the node may have no need of the implicit read permission typically included in a grant of write permission. Correspondingly, in one embodiment, a coherence protocol implemented by system 10 may be configured to distinguish a grant of write-only permission for a coherence unit from a grant of read or read/write permission. The coherence protocol may be further configured to grant write-only permission for the coherence unit without obtaining a current copy of the coherence unit from another node within the system, thereby eliminating the unnecessary memory read and interconnect bandwidth mentioned above with respect to DMA write operations.

Figure 2:
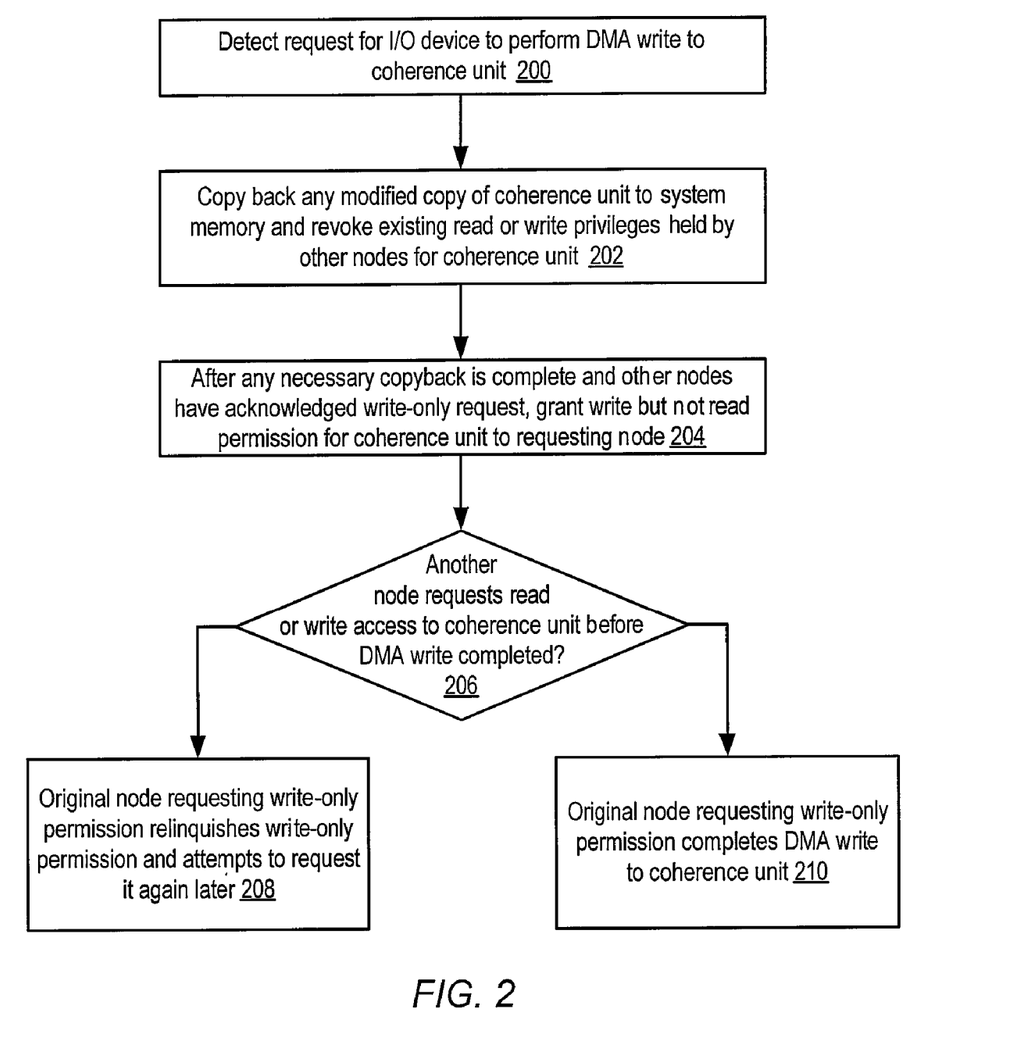
FIG. 2 is a flow diagram illustrating a general method of operation of a coherence protocol configured to grant write-only permission to a coherence unit.

One embodiment of a general method of operation of such a coherence protocol is shown in FIG. 2, and a particular embodiment of such a coherence protocol is described in detail below in conjunction with the descriptions of FIGS. 3-6. Referring collectively to FIGS. 1-2, operation of the method begins in block 200 where a request for an I/O device to perform a DMA write operation to a particular coherence unit is detected. For example, controller 120c of device node 30a may detect a DMA write operation requested by or on behalf of I/O device 130a.

In response to detecting the DMA write operation, any modified copy of the particular coherence unit within system 10 may be copied back to system memory (e.g., such a copy may be flushed from cache 110) and any existing read or write permissions corresponding to the particular coherence unit that are held by any other caches 110 within system 10 may be revoked (block 202). For example, controller 120c may be configured to issue coherence requests to other nodes within system 10 (e.g., using broadcast, directory or other techniques) indicating that write-only permission with respect to the particular coherence unit has been requested. In response to such a request, other nodes may flush their modified copies to system memory if applicable and may transition their local coherence state information to reflect that they no longer have read or write permission with respect to the particular coherence unit (e.g., by invalidating it). Upon completing these activities, the other nodes may acknowledge completion to the requesting node.

Once it has been determined that the particular coherence unit has been synchronized with system memory and that other nodes have acknowledged the write-only request, write-only permission (that is, write permission but not read permission) for the entire coherence unit may be granted to the requesting node (block 204). For example, in response to receiving acknowledgements of the write-only coherence request from other nodes within system 10, controller 120c may be configured to grant write-only permission for the particular coherence unit to cache 110c. It is noted that in some embodiments, allocating a coherence unit within cache 110c for the DMA write operation may result in displacement or eviction of a different coherence unit. As with evictions generally, if the evicted unit is modified with respect to system memory, it may be written back; otherwise it may simply be overwritten.

Once write-only permission has been granted for the particular coherence unit, another node may request read or write access to the particular unit before the DMA write operation may be completed (block 206). If this occurs, the original node that requested write-only permission may relinquish it and attempt to obtain it again at a later time (block 208). Otherwise, the original node may complete the DMA write operation to the particular coherence unit (block 210). In some embodiments, once the DMA write operation completes, read permission may be granted in addition to write permission. For example, upon completion of the DMA write, controller 120c may be configured to transition the particular coherence unit in cache 110c from a write-only state to a modified state that includes both read and write permission. In some embodiments, an attempt by a node to read a coherence unit for which it has only write permission may result in an attempt by controller 120 to secure read permission through appropriate coherence state transitions. For example, in an embodiment where read permission is automatically granted to a write-only coherence unit after completion of the relevant DMA write operation, controller 120 may simply delay the attempt to read the coherence unit until after the write operation is completed. Alternatively, controller 120 may separately request read permission for the coherence unit and coordinate this request with the outstanding DMA write operation to ensure that data that may be obtained from another node or from system memory does not overwrite data from the DMA write operation within local cache 110. In another embodiment, controller 120 may perform a non-allocating read operation in which data may be returned from another node or system memory to satisfy the read request without being installed within cache 110, thus avoiding potentially overwriting data from the DMA write operation. Other techniques for handling read request directed to coherence units having write-only permission are possible and contemplated.

Example Coherence Protocol Including Write-only State

In various embodiments, the write-only permission that may be granted in response to a request to write to a particular coherence unit as described above may be implemented in the context of a coherence protocol. Typically, a coherence protocol may define a number of coherence states and may further define coherence events causing or resulting from transitions among the coherence states. Each node within a system such as system 10 may be configured to explicitly or implicitly assign to each coherence unit a particular coherence state defined from the perspective of that node according to the coherence protocol. For example, controller 120 of a given node may be configured to manage coherence state information and transitions for the given node. Alternatively, coherence state information may be managed by a centralized agent or service within system 10 acting on behalf of the nodes.

Figure 3:
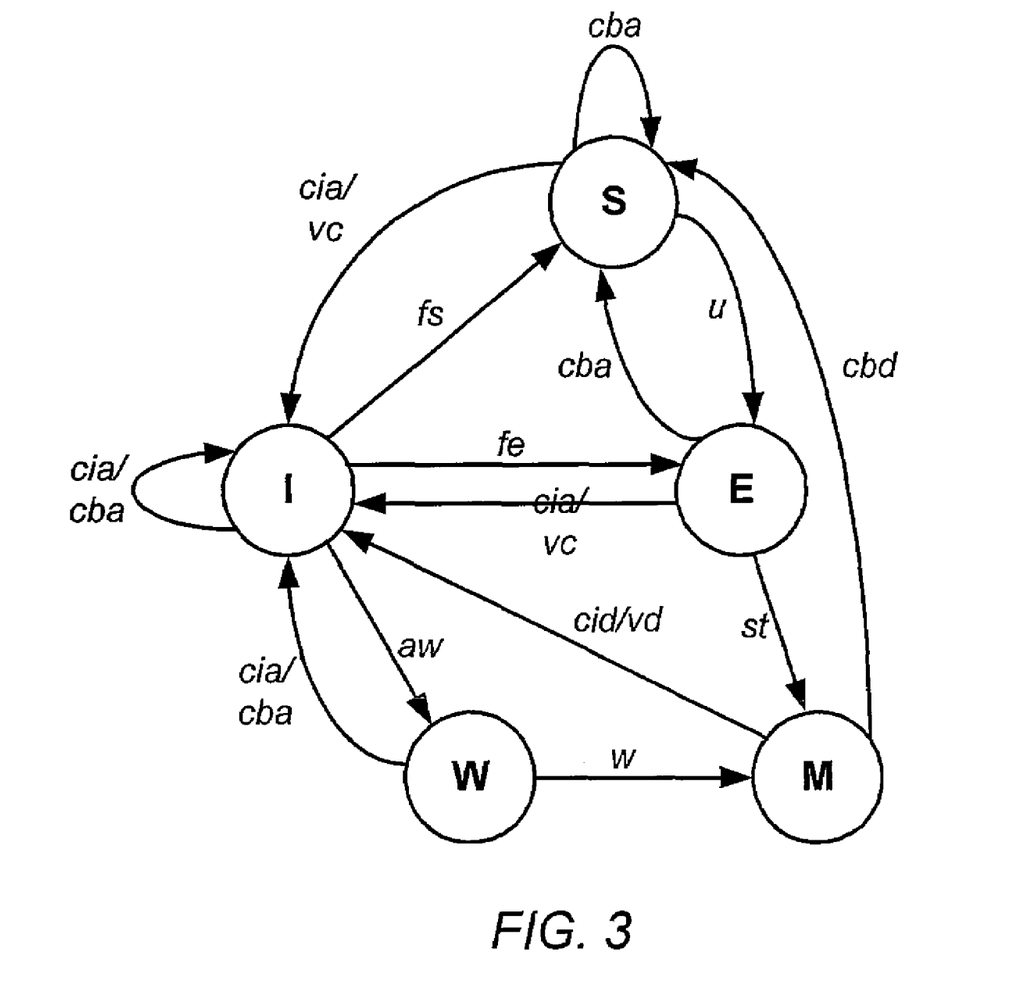
FIG. 3 is a state diagram illustrating one embodiment of a MESI+W cache coherence protocol configured to include a write-only coherence state.

For purposes of illustration, FIG. 3 shows a state transition diagram of an embodiment of the MESI coherence protocol that has been augmented to include an additional write-only (W) state and to show transitions relevant to the W state. It is noted that the illustrated embodiment is merely exemplary and that a write-only state such as described herein may be incorporated into any suitable coherence protocol having more, fewer or differently-defined states and transitions than those shown in FIG. 3.

In the illustrated embodiment of the MESI+W protocol, the various coherence states may be defined as follows. The Invalid (I) state may denote a coherence unit that has no access permissions (e.g., no read or write permissions). The Shared (S) state may denote a coherence unit that is clean (unmodified with respect to system memory) and has read permission, but not write permission. The Exclusive (E) and Modified (M) states may denote a coherence unit that has both read and write permissions and is either clean or dirty (modified with respect to system memory), respectively. The Write-only (W) state may denote a coherence unit that is clean and has write but not read permission. The various transitions among coherence states are discussed below in conjunction with the descriptions of FIGS. 4-6.

Prior to the occurrence of coherence protocol activity, in one embodiment the default or reset coherence state of a given coherence unit may be the I state. That is, before a given node has attempted to access a given coherence unit for the first time, the given coherence unit may be invalid with respect to the given node. (The given coherence unit may also be invalidated after having been accessed, as described below.) In the illustrated state diagram, there are shown three possible transitions to other states from the I state, which may correspond to three respective types of memory access requests as defined by one embodiment of the MESI+W protocol: a request for shared access to a coherence unit, a request for exclusive access to a coherence unit, and a request for write-only (or alternatively, write-entire-unit) access to a coherence unit.

Figure 4:
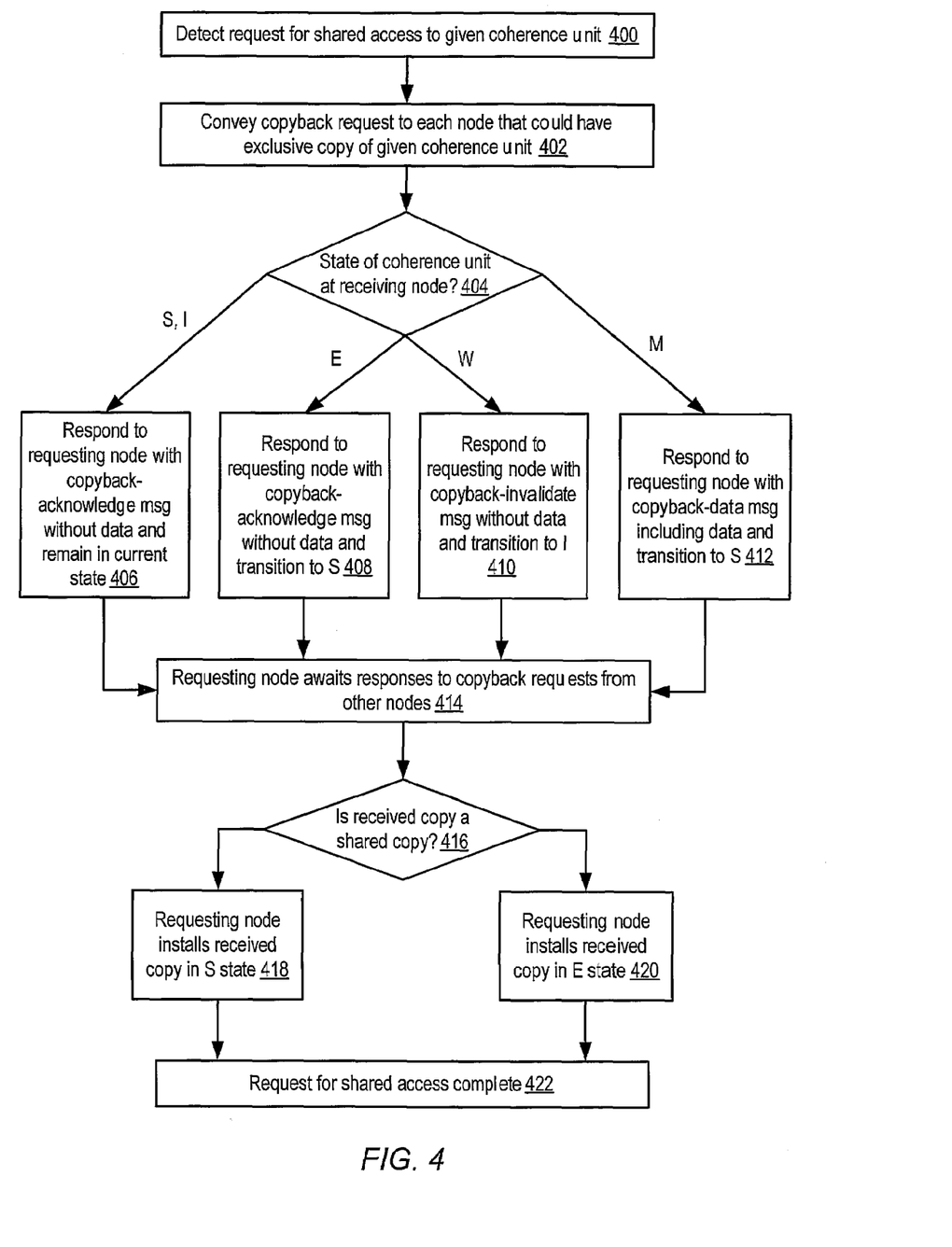
FIG. 4 is a flow diagram illustrating one embodiment of a method of operation of a request for shared memory access according to a coherence protocol including a write-only coherence state.
Figure 5:
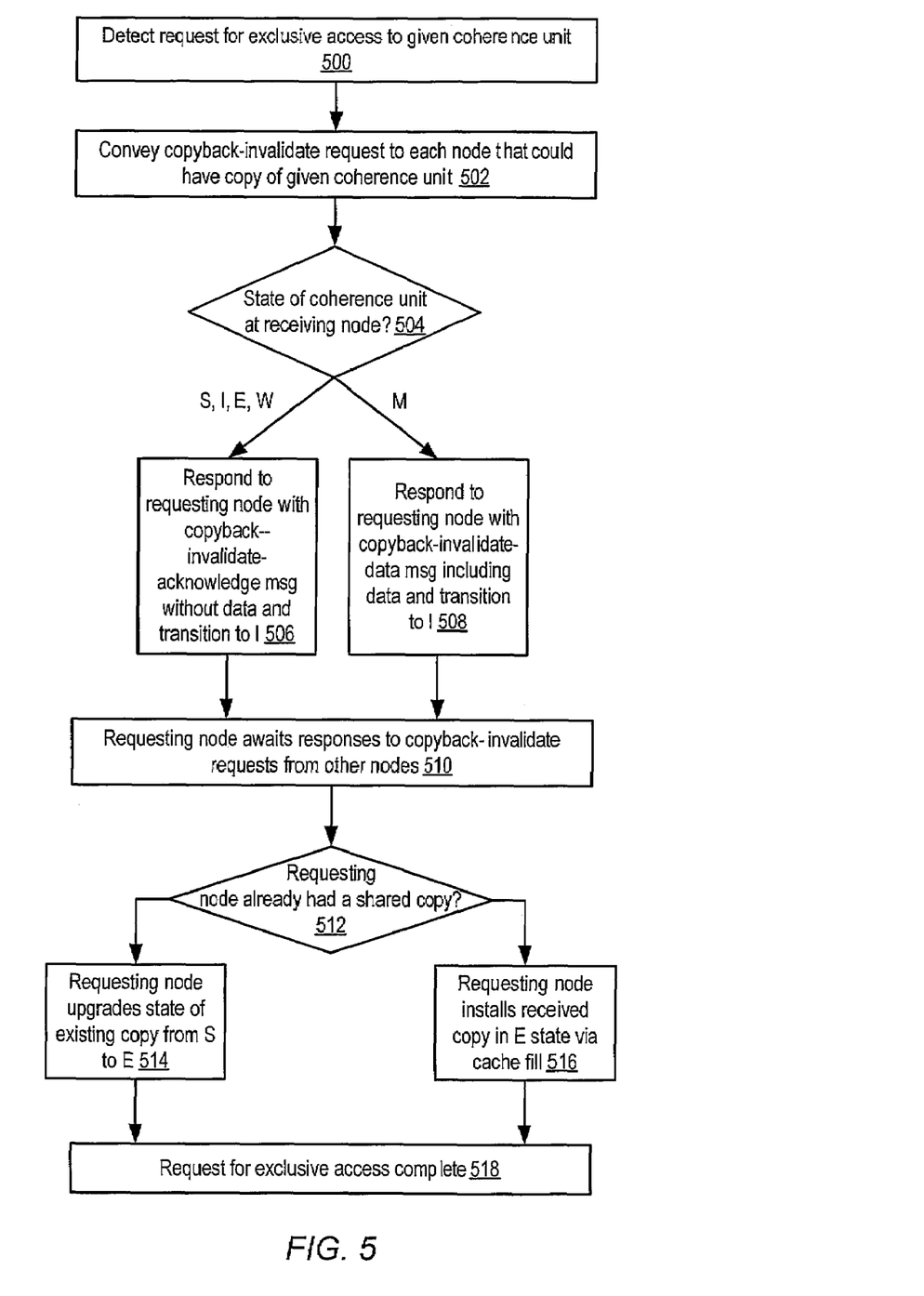
FIG. 5 is a flow diagram illustrating one embodiment of a method of operation of a request for exclusive memory access according to a coherence protocol including a write-only coherence state.
Figure 6:
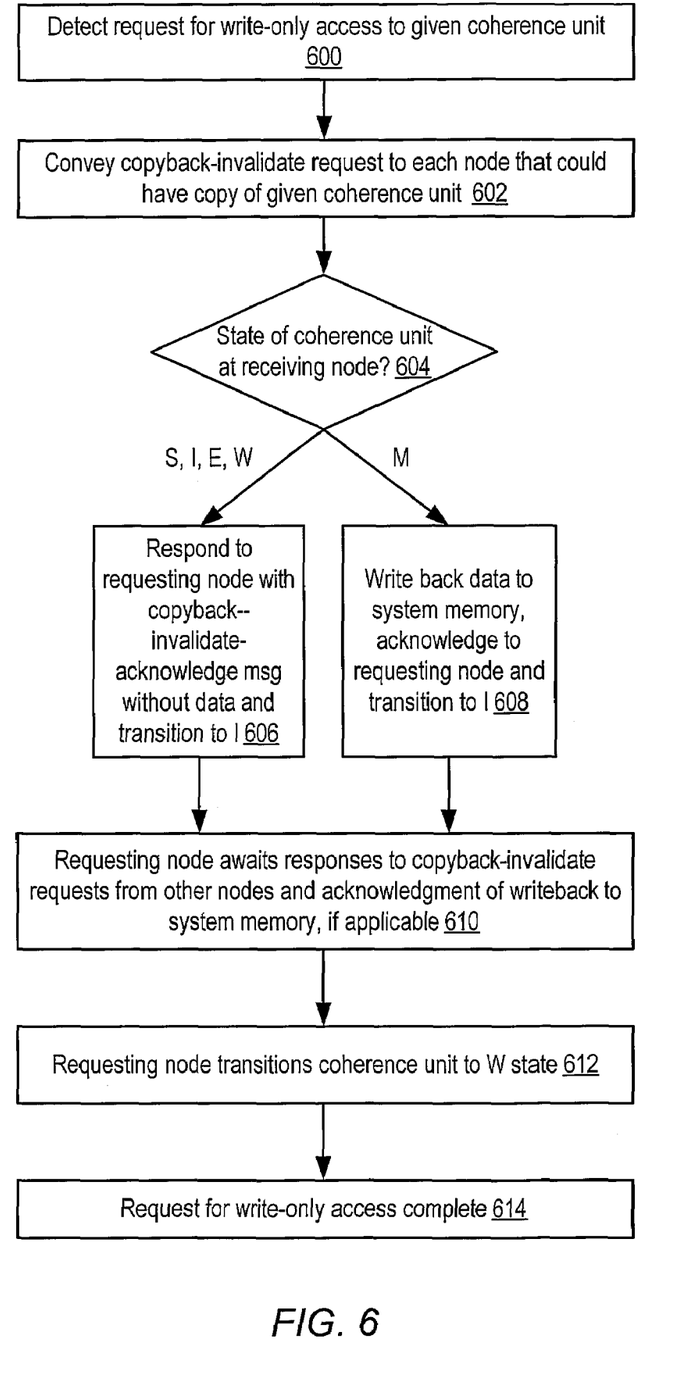
FIG. 6 is a flow diagram illustrating one embodiment of a method of operation of a request for write-only memory access according to a coherence protocol including a write-only coherence state.

One embodiment of a method of operation of a request for shared access to a currently invalid coherence unit, according to one embodiment of the MESI+W protocol of FIG. 3, is shown in FIG. 4. To facilitate exposition, the operation of various memory access requests as shown in FIGS. 4-6 is described from the perspective of the system as a whole. However, it is understood that such a protocol may be implemented by individual state machines corresponding to individual nodes within the system and configured to receive various inputs and responsively generate corresponding outputs. That is, the global coherence operation of the system as a whole may be equivalently expressed as a superposition of the methods of operation of individual nodes of the system.

Referring collectively to FIGS. 1-4, operation begins in block 400 where a request for shared access to a given coherence unit is detected. For example, a processor 100 or other device within system 10 may be configured to generate a request for shared access to a coherence unit when a request to read (but not modify) data located within the coherence unit occurs. A read request may correspond to, e.g., an ordinary processor load operation, such as an executed load instruction, or to any other suitable type of read operation. In one embodiment, the request for shared access may be detected by the controller 120 of the requesting node, for example as part of a memory access request resulting from a miss in local cache 110 or a higher-level cache within the node.

In response to detecting the request for shared access, a request for a copy of the given coherence unit may be conveyed to each node that could have an exclusive, non-shared copy of the given coherence unit (e.g., a node that could have the given coherence unit in one of the E, M or W states) (block 402). In some embodiments, this copy or copyback request may be conveyed as a broadcast request to all nodes within system 10. In other embodiments, such as embodiments in which directory schemes are employed, the copyback request may be conveyed only to those specific nodes indicated by the directory as having the given coherence unit in the relevant non-shared state. In addition to the copyback request, which may be directed to the caches 110 of the various nodes, in some embodiments the given coherence unit may also be separately requested from system memory.

A node's response to a received copyback request may depend on the state of the given coherence unit at the receiving node (block 404). If the receiving node has the coherence unit in the S or I state (i.e., it has a non-exclusive copy of the unit, or no copy at all), it may respond to the requesting node with a copyback-acknowledge message without providing data, and may remain in its current state (block 406). In FIG. 3, this case is illustrated as the cba transition originating from and terminating in the S and I states, respectively. In directory-based embodiments in which a copyback request is sent only to those nodes having an exclusive copy of the given coherence unit, this case may not occur. In some embodiments, a node having a shared copy of the given coherence unit may respond with a copy of the data rather than a simple acknowledgment. In other embodiments, the given coherence unit may be provided from system memory rather than from a node having a shared copy.

If the receiving node has a copy of the given coherence unit in the E state, it may respond to the requesting node with a copyback-acknowledge message without providing data, and may transition to the S state (block 408). This is illustrated in FIG. 3 as the cba transition from state E to state S. If the receiving node has a copy of the given coherence unit in the W state, it may respond to the requesting node with a copyback-acknowledge message without providing data, and may transition to the I state (block 410). This is illustrated in FIG. 3 as the cba transition from state W to state I. If the receiving node has a copy of the given coherence unit in the M state, it may respond to the requesting node with a copyback-data message that acknowledges the request and provides a copy of the coherence unit data as modified by the receiving node, and may transition to the S state (block 412). This is illustrated in FIG. 3 as the cbd transition from state M to state S.

The requesting node may then wait to receive responses from the various nodes to which the copyback request was sent (block 414). In some embodiments, the requesting node may expect at least an acknowledgement from each node, while in other embodiments, the requesting node may await responses from a particular subset of nodes. Once all expected responses have been received, the requesting node may have a copy of the given coherence unit, either as provided by another node or from system memory. If the received copy of the given coherence unit is a shared copy (e.g., at least one other node has the given coherence unit in the S state), the requesting node may install the received copy locally in the S state (blocks 416-418). For example, controller 120 may allocate an entry for the given coherence unit within cache 110 and store the received copy in the allocated entry. Similarly, if the received copy of the given coherence unit is an exclusive copy, the requesting node may install the received copy locally in the E state (blocks 416-420). These transitions are illustrated in FIG. 3 as the fill-shared or fs transition between the I and S states and the fill-exclusive or fe transition between the I and E states. Once the given coherence unit has been installed within the requesting node, the request for shared access is complete (block 422).

One embodiment of a method of operation of a request for exclusive access to a currently invalid coherence unit, according to one embodiment of the MESI+W protocol of FIG. 3, is shown in FIG. 5. Referring collectively to FIGS. 1-3 and 5, operation begins in block 500 where a request for exclusive access to a given coherence unit is detected. For example, a processor 100 or other device within system 10 may be configured to generate a request for exclusive access to a coherence unit when a request to read the coherence unit with the intent to modify it occurs. Such a read-with-intent-to-modify request may correspond to, e.g., an ordinary processor store operation, such as an executed store instruction, or to any other suitable type of read-modify-write operation. In some embodiments, a request for exclusive access to a coherence unit may result from any attempt to partially write to the coherence unit, regardless of whether the data is actually intended to be read before being written. In one embodiment, the request for exclusive access may be detected by the controller 120 of the requesting node, for example as part of a memory access request resulting from a miss in local cache 110 or a higher-level cache within the node.

In response to detecting the request for exclusive access, a copyback-invalidate request for a copy of the given coherence unit may be conveyed to each node that could have a copy of the given coherence unit (block 502). Generally speaking, the copyback-invalidate request may function to both obtain a copy of the given coherence unit for the requesting node and to cause other copies of the given coherence unit to be invalidated within other nodes. As in the case of a request for shared access as described above, in various embodiments a copyback-invalidate request may be either broadcast to all nodes within system 10 or selectively conveyed to certain nodes according to a directory scheme. In addition to the copyback-invalidate request, which may be directed to the caches 110 of the various nodes, in some embodiments the given coherence unit may also be separately requested from system memory.

A node's response to a received copyback-invalidate request may depend on the state of the given coherence unit at the receiving node (block 504). If the receiving node has the coherence unit in the S, E, I or W state, it may respond to the requesting node with a copyback-invalidate-acknowledge message without providing data, and may transition to the I state (block 506). In FIG. 3, this case is illustrated as the set of cia transitions respectively originating from the S, E, I and W states and terminating in the I state. In some embodiments, a node having a shared copy of the given coherence unit may respond with a copy of the data rather than a simple acknowledgment. In other embodiments, the given coherence unit may be provided from system memory rather than from a node having a shared copy.

If the receiving node has a copy of the given coherence unit in the M state, it may respond to the requesting node with a copyback-invalidate-data message that acknowledges the request and provides a copy of the coherence unit data as modified by the receiving node, and may transition to the I state (block 508). This is illustrated in FIG. 3 as the cid transition from state M to state I.

The requesting node may then wait to receive responses from the various nodes to which the copyback-invalidate request was sent (block 510). As with the request for shared access described above, in some embodiments, the requesting node may expect at least an acknowledgement from each node, while in other embodiments, the requesting node may await responses from a particular subset of nodes. Once all expected responses have been received, the requesting node may have a copy of the given coherence unit, either as provided by another node or from system memory. If the requesting node already had the given coherence unit in the S state when it requested exclusive access, it may simply upgrade the state of the given unit from S to E without having to install a new copy of the data (blocks 512-514). This transition is illustrated in FIG. 3 as the u transition between the S and E states. Otherwise, the given coherence unit is installed within the requesting node in the E state via a cache fill (blocks 512-516). This transition is illustrated in FIG. 3 as the transition between the I and E states.

Once the given coherence unit has been installed within the requesting node in the E state, the request for exclusive access is complete (block 518). If the requesting node then actually writes to the given coherence unit, its state may be upgraded from E to M (corresponding to the st transition shown in FIG. 3). However, in some embodiments this may be a strictly local or silent transition. That is, this transition need not be broadcast to other nodes or otherwise made visible externally to the requesting node at the time of the transition. However, in some embodiments the transition from E to M may be subsequently made visible to other nodes, for example due to subsequent victimizations of or requests for the given coherence unit.

One embodiment of a method of operation of a request for write-only access (or alternatively, write-entire-unit access) to a currently invalid coherence unit, according to one embodiment of the MESI+W protocol of FIG. 3, is shown in FIG. 6. Referring collectively to FIGS. 1-3 and 6, operation begins in block 600 where a request for write-only access to a given coherence unit is detected. Such a request may occur, for example, in response to an I/O device 130 requesting a DMA write to a coherence unit, as described above with respect to FIG. 2. However, it is contemplated that in some embodiments, any suitable type of request to write a coherence unit without dependence on reading that unit may trigger a request for write-only access, regardless of whether such a request serves a DMA transfer originating from an I/O device 130 of a device node 30 or some other type of transfer from another type of node.

Similar to the exclusive access case, in response to detecting the request for write-only access, a copyback-invalidate request for a copy of the given coherence unit may be conveyed to each node that could have a copy of the given coherence unit (block 602). The semantics of the copyback-invalidate request may be similar to those in the exclusive access case described above, and broadcast or directory techniques may be used in a similar fashion. It is noted that in some embodiments, it may not be necessary for a receiving node to distinguish the type of access request that caused the copyback-invalidate request to be sent. That is, the receiving node need not distinguish whether the copyback-invalidate request pertains to exclusive or write-only access.

A node's response to a received copyback-invalidate request may depend on the state of the given coherence unit at the receiving node (block 604). If the receiving node has the coherence unit in the S, E, I or W state, it may respond to the requesting node with a copyback-invalidate-acknowledge message without providing data, and may transition to the I state (block 606). These transitions may be similar to those in the exclusive access case described above.

If the receiving node has a copy of the given coherence unit in the M state, it may respond to the requesting node with a copyback-invalidate-data message that acknowledges the request. The receiving node may also write back its modified copy of the coherence unit data to system memory, and may transition to the I state (block 608). This is illustrated in FIG. 3 as the cid transition from state M to state I. In some embodiments, the write back of the modified coherence unit data to system memory may be performed by another agent on behalf of the receiving node, which may convey an acknowledgement to the requesting node once this is complete. The copy of the coherence unit data need not be provided to the requesting node in this case.

The requesting node may then wait to receive responses from the various nodes to which the copyback-invalidate request was sent, and may further wait for acknowledgement that dirty coherence unit data has been written back to system memory, if applicable (block 610). As with the request for shared access described above, in some embodiments, the requesting node may expect at least an acknowledgement from each node, while in other embodiments, the requesting node may await responses from a particular subset of nodes. Once all expected responses have been received, the requesting node may transition the coherence unit from the I to the W state (block 612). This transition is illustrated in FIG. 3 as the acknowledge-writeback or aw transition between the I and W states. It is noted that it is unnecessary to actually provide a copy of the coherence unit data to the requesting node prior to transitioning to the W state, thus reducing the bandwidth required to complete the write-only access operation relative to embodiments that do not implement the W state.

Once the given coherence unit has transitioned to the W state, the request for write-only access is complete (block 614). If the requesting node then actually writes to the given coherence unit, its state may be upgraded from W to M (corresponding to the w transition shown in FIG. 3). However, like the upgrade from E to M described above, in some embodiments this may be a strictly local or silent transition not broadcast to other nodes.

During the course of allocating a cache entry for a coherence unit in response to a request for shared, exclusive or write-only access, it is possible that the requesting node may need to evict an existing cache entry to make room for the requested data. The evicted or victimized entries may then be invalidated with respect to the requesting node. In the embodiment of FIG. 3, these transitions are denoted as the victim-clean or vc transitions from states S and E to state I, and the victim-dirty or vd transition from state M to state I. In the victim-clean case, the victimized entry may simply be discarded, while in the victim-dirty case, the victimized entry may be written back to system memory. While the coherence protocol embodiment shown in FIG. 3 does not illustrate victimization of coherence units in the W state, this behavior may be supported in some embodiments.

It is noted that the methods and techniques for granting write-only permission to a coherence unit as described above need not be limited to embodiments in which an I/O device seeks to perform a DMA write operation to a coherence unit. It is contemplated that in one embodiment, the techniques discussed above may be applied to any system having multiple nodes with respective caches 110, where a given node seeks to write an entire coherence unit of data within its respective cache 110 for any reason including, but not limited to, a DMA write operation. In accordance with the foregoing, the given node may be granted write but not read permission, thus allowing the given node to complete the write operation without incurring the additional bandwidth costs required to obtain a current local copy of the coherence unit.

As mentioned previously, the particular coherence protocol including the various states and transitions described above is merely exemplary, and it is contemplated that other coherence protocols may be implemented that employ a coherence state or states associated with write permission but not read permission. Also, it is noted that the methods and techniques described above and illustrated in the drawings are illustrative and not limiting with respect to the ordering of the illustrated actions. Where no necessary dependence among method actions is described, it is contemplated that the various actions illustrated in the drawings and discussed above may be performed in any suitable order. Further, in some embodiments, certain illustrated actions may be omitted.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a plurality of nodes including a processor node and an input/output (I/O) node, wherein said processor node includes a processor, wherein said I/O node includes an I/O device, wherein each of said processor and said I/O nodes includes a respective cache memory and a respective cache coherence controller, and wherein said respective cache memories are configured to cache a system memory; and
an interconnect through which each of said plurality of nodes is configured to communicate with other ones of said plurality of nodes;
wherein in response to detecting a request for said I/O device to perform a direct memory access (DMA) write operation to a particular coherence unit of said respective cache memory of said I/O node, and in response to determining that said particular coherence unit is not modified with respect to said system memory and that no other cache memory within the system has read or write permission corresponding to a copy of the particular coherence unit, said respective cache coherence controller of said I/O node is configured to grant write permission but not read permission for said particular coherence unit to said respective cache memory of said I/O node.

2. The system as recited in claim 1, wherein subsequent to said respective cache memory of said I/O node being granted write permission, said I/O device is configured to perform said DMA write operation to said particular coherence unit, and wherein said respective cache controller of said I/O node is further configured to grant read permission for said particular coherence unit to said respective cache memory of said I/O node in response to said I/O device performing said DMA write operation.

3. The system as recited in claim 1, wherein to determine that said particular coherence unit is not modified with respect to said system memory and that no other cache memory within the system has read or write permission corresponding to a copy of the particular coherence unit, said respective cache coherence controller of said I/O node is further configured to convey an invalidate message to other ones of said nodes whose respective cache memories include a copy of said particular coherence unit.

4. The system as recited in claim 3, wherein in response to receiving said invalidate message, a given one of said other ones of said nodes is configured to revoke any previously-granted read or write permissions for its copy of said particular coherence unit and to write back its copy said particular coherence unit to said system memory dependent upon whether said particular coherence unit is modified within said given node.

5. The system as recited in claim 3, wherein to convey said invalidate message to said other ones of said nodes, said respective cache coherence controller of said I/O node is further configured to broadcast said invalidate message to each other one of said plurality of nodes that includes a respective cache memory.

6. The system as recited in claim 3, wherein to convey said invalidate message to said other ones of said nodes, said respective cache coherence controller of said I/O node is further configured to convey said invalidate message to only those ones of said plurality of nodes indicated by a directory as currently storing respective copies of said particular coherence unit.

7. The system as recited in claim 1, wherein said particular coherence unit corresponds to a particular cache line of said respective cache memory of said I/O node.

8. The system as recited in claim 1, wherein said interconnect includes a plurality of point-to-point interconnects, wherein each of said point-to-point interconnects is configured to interconnect exactly two of said plurality of nodes.

9. The system as recited in claim 1, wherein said interconnect includes a switched-fabric interconnect.

10. The system as recited in claim 1, wherein said I/O device includes a mass storage device.

11. The system as recited in claim 1, wherein said I/O device includes a network communications device.

12. A method, comprising:
detecting a request for an input/output (I/O) device included in an I/O node to perform a direct memory access (DMA) write operation to a particular coherence unit of a respective cache memory included in said I/O node, wherein said I/O node is one of a plurality of nodes further including a processor node, wherein said processor node includes a processor and a respective cache memory, and wherein said respective cache memories are configured to cache a system memory;

in response to detecting said request, instructing that any modified copy of said particular coherence unit cached within any other one of said plurality of nodes be written back to said system memory and revoking any outstanding read or write permissions corresponding to copies of said particular coherence unit cached within any other ones of said plurality of nodes; and in response to said revoking, granting write permission but not read permission for said particular coherence unit to said respective cache memory of said I/O node.

13. The method as recited in claim 12, further comprising:

subsequent to granting said write permission, performing said DMA write operation to said particular coherence unit; and in response to performing said DMA write operation, granting read permission for said particular coherence unit to said respective cache memory of said I/O node.

14. The method as recited in claim 12, wherein said instructing that any modified copy of said particular coherence unit cached within any other one of said plurality of nodes be written back to said system memory and said revoking any outstanding read or write permissions corresponding to copies of said particular coherence unit comprise conveying an invalidate message to other ones of said nodes whose respective cache memories include a copy of said particular coherence unit.

15. The method as recited in claim 14, wherein in response to receiving said invalidate message, a given one of said other ones of said nodes is configured to revoke any previously-granted read or write permissions for its copy of said particular coherence unit and to write back its copy said particular coherence unit to said system memory dependent upon whether said particular coherence unit is modified within said given node.

16. The method as recited in claim 15, wherein conveying said invalidate message to said other ones of said nodes comprises broadcasting said invalidate message to each other one of said plurality of nodes that includes a respective cache memory.

17. The method as recited in claim 15, wherein conveying said invalidate message to said other ones of said nodes comprises conveying said invalidate message to only those ones of said plurality of nodes indicated by a directory as currently storing respective copies of said particular coherence unit.

18. The method as recited in claim 12, wherein said particular coherence unit corresponds to a particular cache line of said respective cache memory of said I/O node.

19. The system as recited in claim 12, wherein said plurality of nodes are interconnected for communication by a plurality of point-to-point interconnects, wherein each of said point-to-point interconnects is configured to interconnect exactly two of said plurality of nodes.

20. A system, comprising:

a plurality of nodes each including a respective cache memory and a respective cache coherence controller, wherein said respective cache memories are configured to cache a system memory; and an interconnect through which each of said plurality of nodes is configured to communicate with other ones of said plurality of nodes;

wherein in response to detecting a request for a given one of nodes to perform a write operation to an entire coherence unit of said respective cache memory of said given node, and in response to determining that said coherence unit is not modified with respect to said system memory and that no other cache memory within the system has read or write permission corresponding to a copy of the coherence unit, said respective cache coherence controller of said given node is configured to grant write permission but not read permission for said particular coherence unit to said respective cache memory of said given node.

* * * * *

UNITED STATES PATENT AND TRADEMARK OFFICE
CERTIFICATE OF CORRECTION

PATENT NO. : 7,657,710 B2
APPLICATION NO. : 11/561203
DATED : February 2, 2010
INVENTOR(S) : Paul N. Loewenstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Thirtieth Day of November, 2010

David J. Kappos
*Director of the United States Patent and Trademark Office*